United States Patent
Isomura (10) Patent No.: US 6,173,627 B1
(45) Date of Patent: Jan. 16, 2001

(54) STEERING WHEELS HAVING COVERS (75) Inventor: Motoi Isomura, Nagoya (JP)

(73) Assignee: Toyoda Gosei Co. Ltd., Aichi-ken (JP)

( * ) Notice: Under 35 U.S.C. 154(b), the term of this patent shall be extended for 0 days.

(21) Appl. No.: 09/138,604

(22) Filed: Aug. 24, 1998

(30) Foreign Application Priority Data

Aug. 25, 1997 (JP) ................................................. 9-228412
Aug. 29, 1997 (JP) ................................................. 9-234714

(51) Int. Cl.$^7$ ....................................................... B62D 1/11
(52) U.S. Cl. ............................................. 74/558; 280/777
(58) Field of Search ............................. 74/552; 280/777, 280/731

(56) References Cited

U.S. PATENT DOCUMENTS

| | | | |
|---|---|---|---|
| 4,390,193 | * | 6/1983 | Strahan et al. ...................... 74/552 X |
| 4,953,423 | * | 9/1990 | Maeda et al. ............................ 74/552 |
| 5,244,230 | * | 9/1993 | Komiya et al. ...................... 74/552 X |
| 5,706,707 | * | 1/1998 | Sanders ................................. 74/552 |

FOREIGN PATENT DOCUMENTS 5-193503 * 8/1993 (JP) ...................................... 74/552

* cited by examiner

*Primary Examiner*—Mary Ann Green
(74) *Attorney, Agent, or Firm*—Pillsbury, Madison & Sutro LLP (57) ABSTRACT

A steering wheel has an annular steering grip, spokes extending radially inward from the steering grip, and a pad located at the center of the grip. A back cover is arranged below the spokes and the pad. The spoke located closest to the driver's position is held by a pair of hooks projecting from the back cover. Each hook has a connecting rib. The connecting ribs separate the hooks during relative movement between the spokes and the back cover. A guide rib is arranged on the rim of the back cover in correspondence with each spoke to facilitate the attachment of the back cover. Each guide rib extends in the longitudinal direction of the associated spoke. The guide rib permits relative movement between the back cover and the spokes.

16 Claims, 8 Drawing Sheets

STEERING WHEELS HAVING COVERS

BACKGROUND OF THE INVENTION

The present invention relates to a steering wheel for a vehicle, and more particularly, to a steering wheel having a cover.

A conventional steering wheel has an annular steering grip, spokes extending radially inward from the steering grip, and a pad located at the central portion of the steering grip. The spokes are connected to a boss, which is further connected to a steering shaft.

Figure 11:
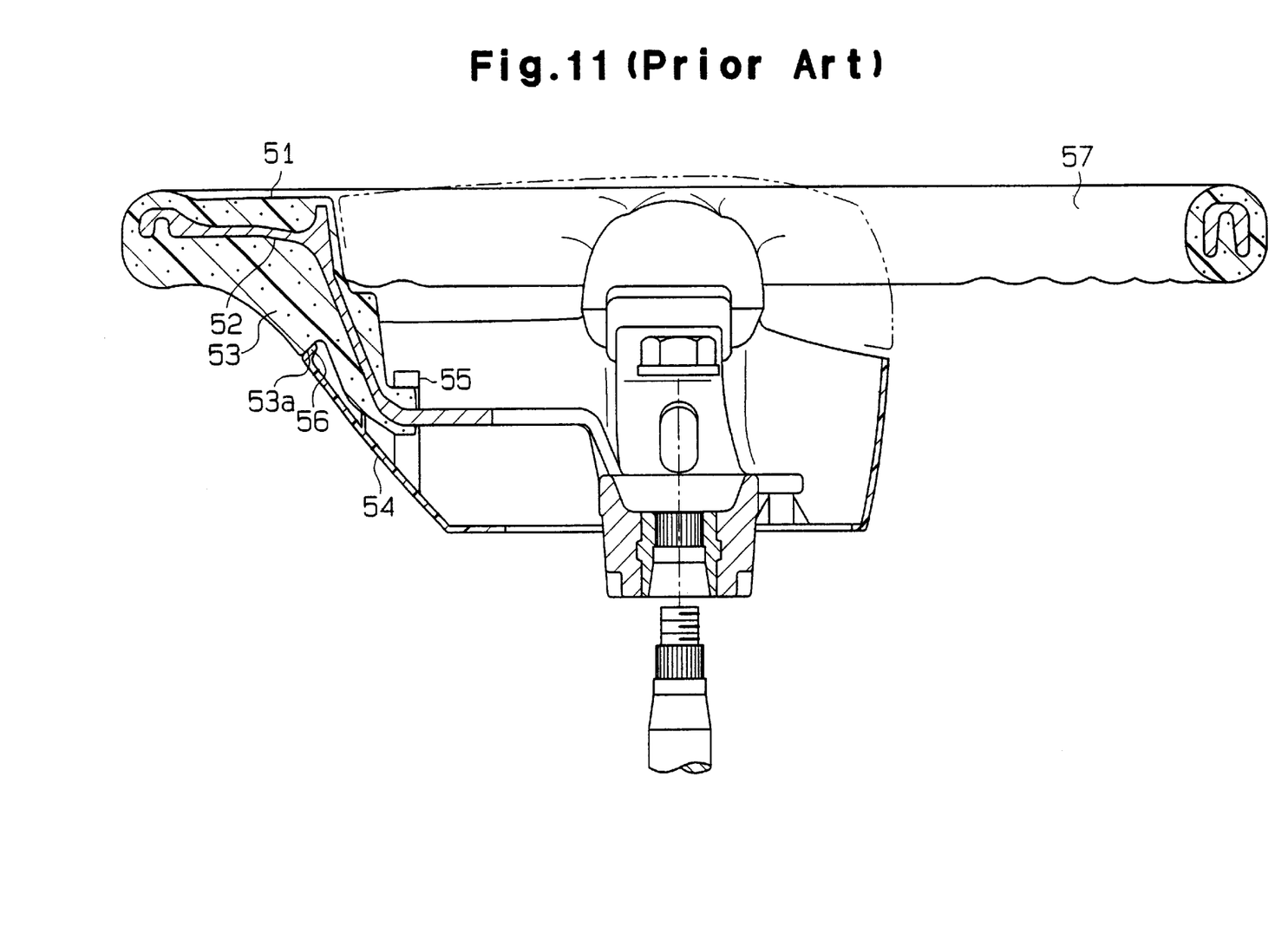
FIG. 11 is a cross-sectional view showing a prior art steering wheel.

The steering shaft extends through a resin back cover, which is located below the spokes and the pad. A typical steering wheel is shown in FIG. 11. As shown in the drawing, a spoke 51 (only one shown) includes a spoke core 52 and an encrustment 53. The spoke 51 shown is the spoke located closest to the driver's position. The encrustment 53 is formed of urethane foam or the like and covers the spoke core 52. The encrustment 53 has a depression 53a to receive a back cover 54. The back cover 54 contacts the depression 53a such that the outer surface of the encrustment 53 is flush to the outer surface of the back cover 54. This improves the appearance of the steering wheel.

The back cover 54 may be fastened to the steering wheel using bolts or the like. Alternatively, as shown in FIG. 11, the back cover 54 may also be fastened to the steering wheel by engaging a hook 55, which extends upward from the back cover 54, with the spoke 51.

A guide 56 extends along the rim of the back cover 54 in correspondence with the spoke 51. The guide 56 faces the wall of the encrustment depression 53a and has a flat surface for engagement with the depression 53a. To attach the back cover 54 to the steering wheel, the guide 56 is moved along the surface of the associated encrustments 53 such that the cover 54 is guided to the designated position with respect to the steering wheel. This structure facilitates the attachment of the back cover 54.

In such steering wheel, application of a force acting from above or from the driver's position on the steering grip 57 is transmitted to the back cover 54 by way of the spoke 51. The force acting on the spoke 51 is then transmitted to the guide 56, which is in planar contact with the encrustment 53. As a result, the guide 56 hinders further movement of the spoke 51 and the steering grip 57.

Furthermore, the hook 55, which engages the spoke 51, may also hinder relative movement between the back cover 54 and the steering grip 57. This lack of relative movement described above may cause injury to a driver in an accident.

SUMMARY OF THE INVENTION

In order to address the deficiencies in the prior art, the present inventors propose that the steering grip 57 and the spoke 51 (the spoke closest to the driver) be movable relative to the back cover 54. Relative movement between the spoke 51 and the back cover 54 would absorb a force applied to the steering grip 57.

Accordingly, it is an objective of the present invention to provide a steering wheel having a cover that absorbs forces applied to the steering wheel.

To achieve the above objective, the present invention provides a steering wheel including an annular steering grip, a spoke extending radially inward from the steering grip, and a back cover for covering the lower portion of the steering wheel. The back cover has a rim located adjacent to the spoke. A guide is located at the vicinity of the back cover rim for guiding the back cover to a predetermined attaching position when attaching the back cover to the steering wheel. The guide extends in the longitudinal direction of the spoke and contacts the spoke. The application of pressure on the guide by the spoke separates the guide from the spoke and permits relative movement between the back cover and the spoke.

In another aspect of the present invention, a steering wheel includes an annular steering grip, a spoke extending radially inward from the steering grip, a back cover for covering the lower portion of the steering wheel, and a pair of hooks projecting from the back cover and facing each other at each side of the spoke. The spoke is held between the hooks to attach the back cover to the steering wheel. A releasing member is provided for each hook. The releasing members separate the hooks from each other to release the hooks from the spoke and permit relative movement between the back cover and the spoke when the spoke is pressed against the releasing member.

In a further aspect of the present invention, a steering wheel includes an annular steering grip, a spoke extending radially inward from the steering grip, and a back cover for covering the lower portion of the steering wheel. The back cover includes a bottom wall for covering the spoke from beneath and a pair of side walls extending continuously from the bottom wall to cover the sides of the spoke. A pair of hooks project from the bottom wall and face each other at each side of the spoke. The spoke is held between the hooks to attach the back cover to the steering wheel. A connecting rib is provided for each hook to connect the hook to the associated side wall. The connecting ribs separate the hooks from each other to release the spoke when a force that separates the side walls acts on the back cover.

In another aspect of the present invention, a steering wheel includes an annular steering grip, a spoke extending radially inward from the steering grip, and a back cover for covering the lower portion of the steering wheel. The back cover includes a bottom wall for covering the spoke from beneath and a pair of side walls extending continuously from the bottom wall to cover the sides of the spoke. The bottom wall and side walls each have an edge located adjacent to the spoke. The spoke has a depression for contact with the edges of the bottom wall and side walls. A guide rib is located at the vicinity of the bottom wall rim for guiding the back cover to a predetermined attaching position when attaching the back cover to the steering wheel. The guide rib extends in the longitudinal direction of the spoke and contacts the spoke. The application of pressure on the guide rib by the spoke depression separates the guide rib from the depression and permits relative movement between the back cover and the spoke.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

An embodiment according to the present invention will now be described with reference to the drawings.

Figure 2:
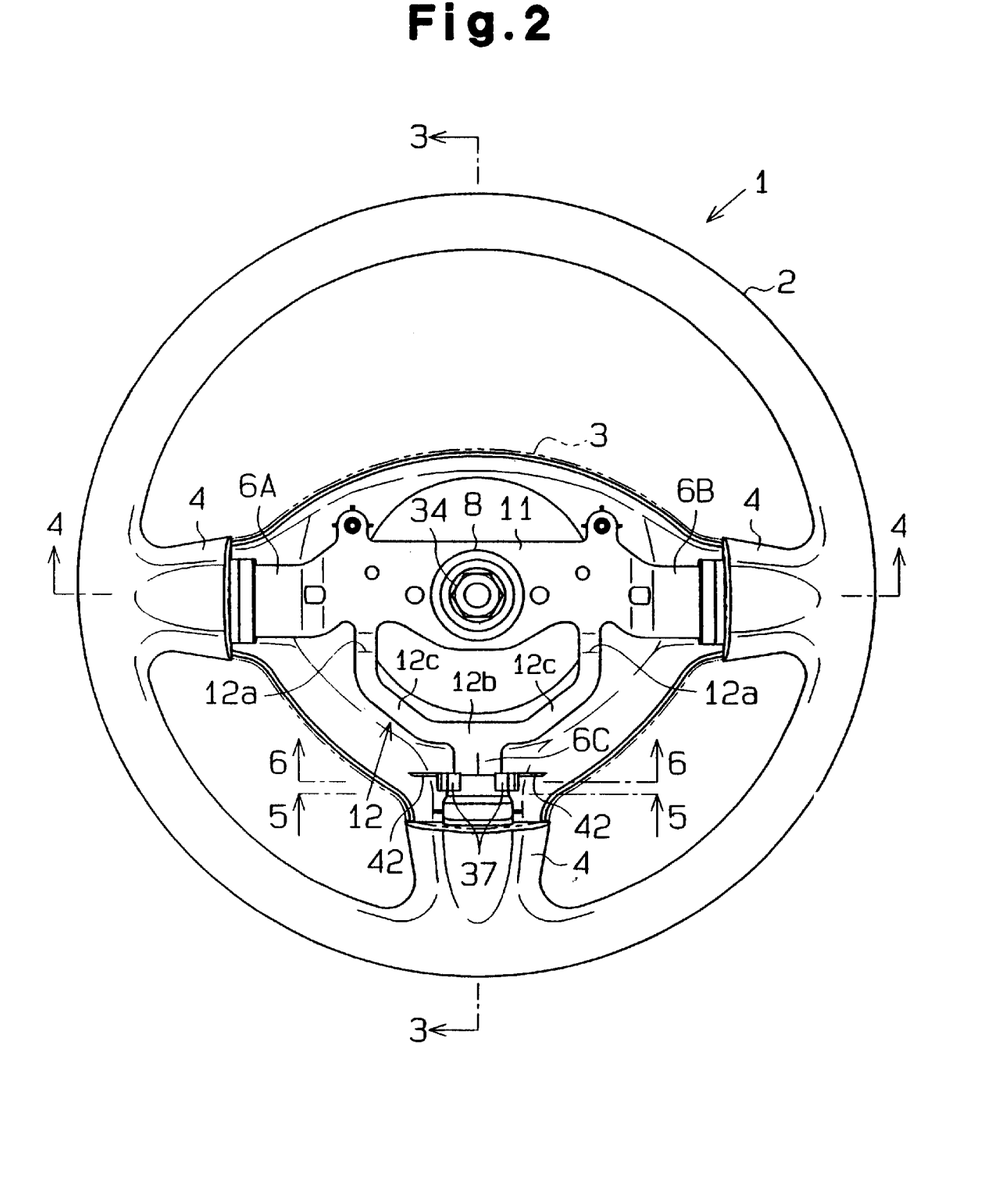
FIG. 2 is a plan view showing the cover of FIG. 1.
Figure 3:
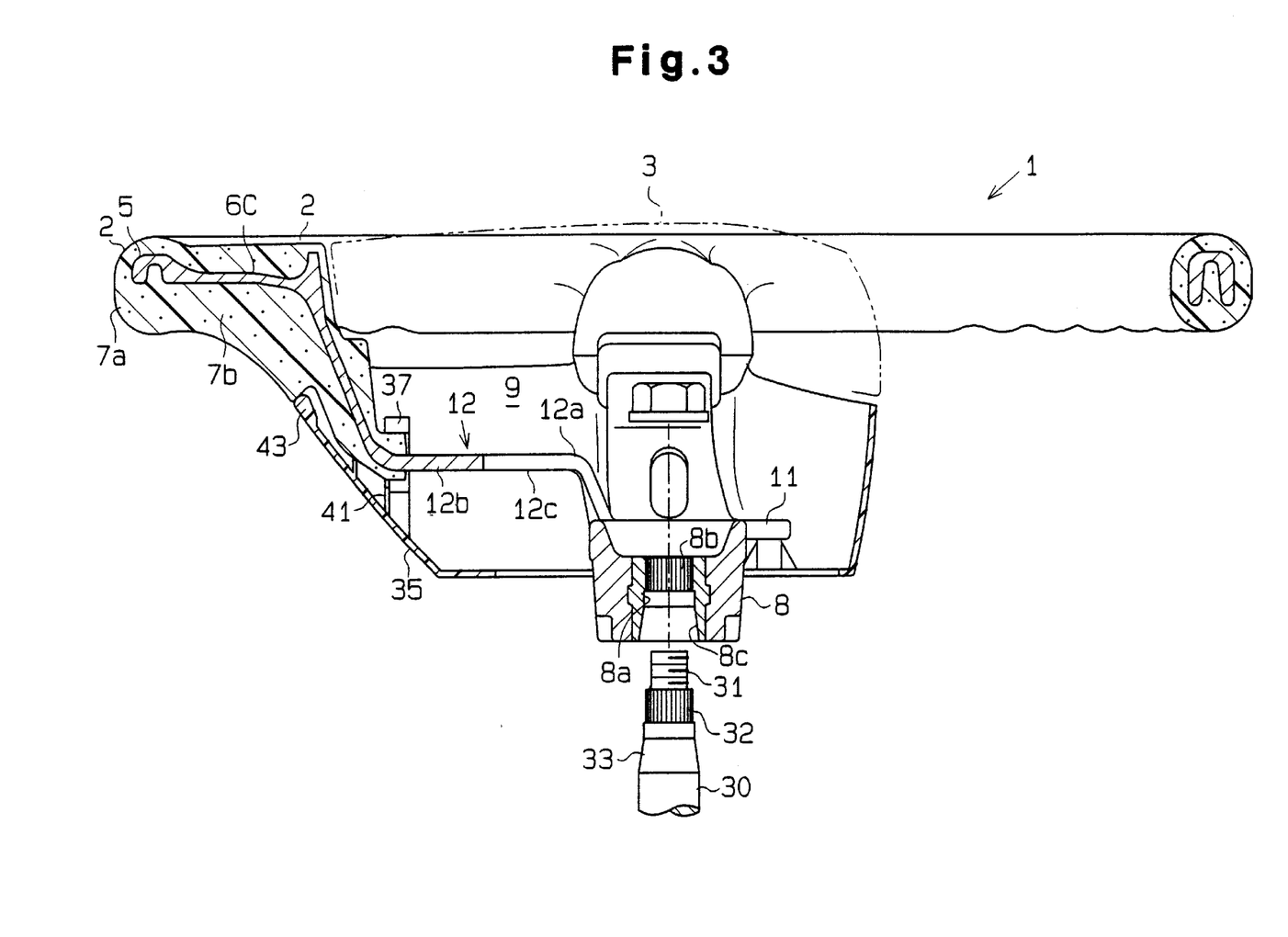
FIG. 3 is a cross-sectional view taken along line 3—3 in FIG. 2.
Figure 4:
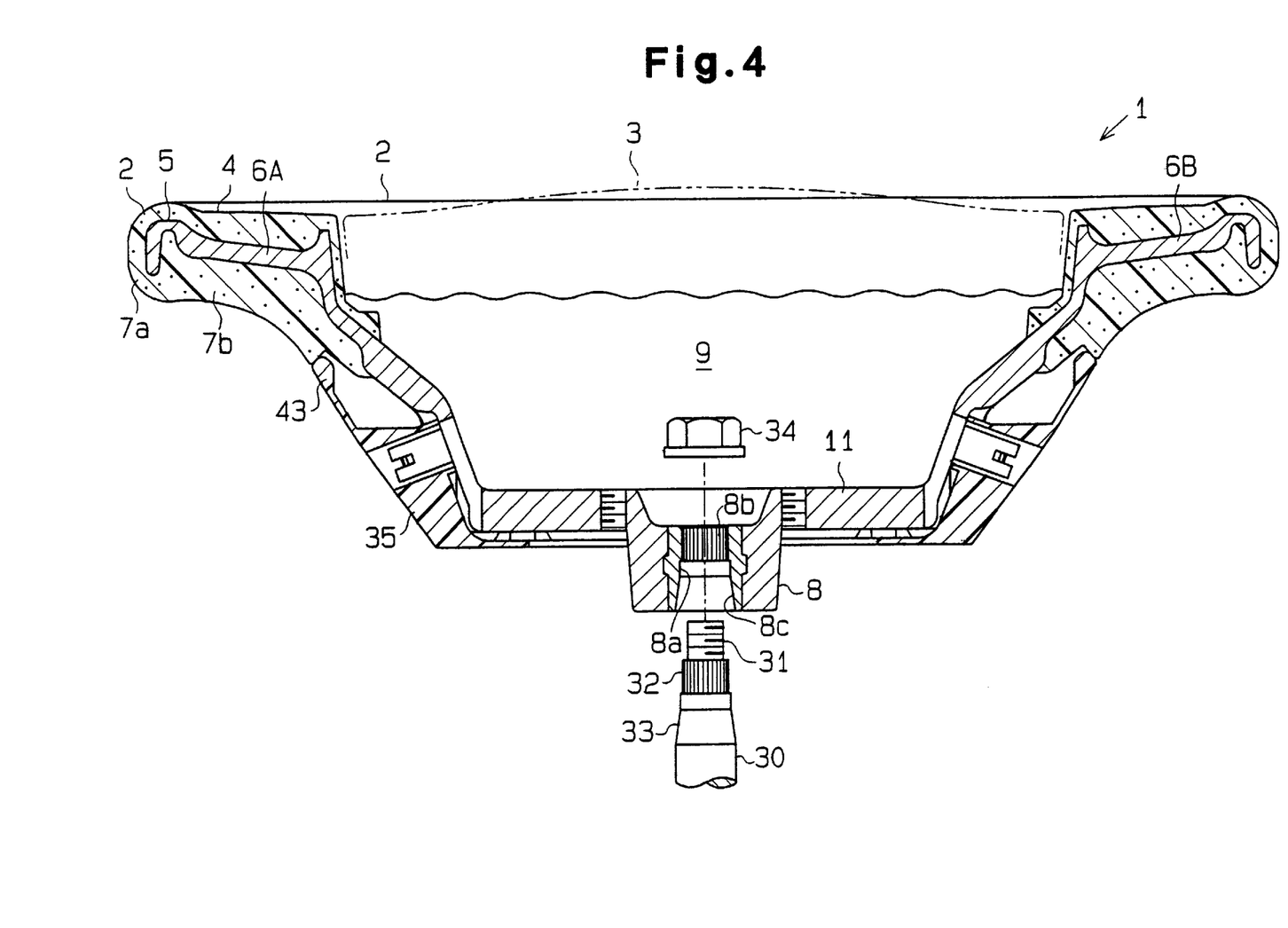
FIG. 4 is a cross-sectional view taken along line 4—4 in FIG. 2.
Figure 5:
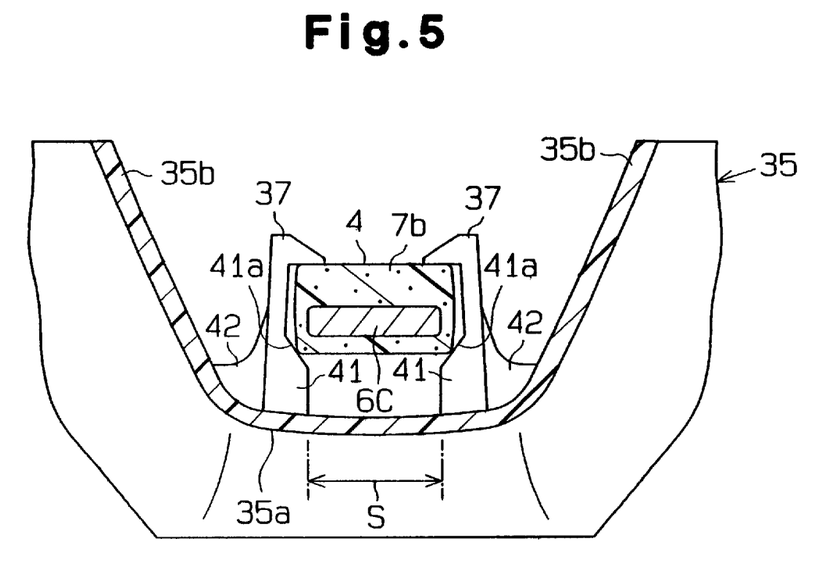
FIG. 5 is a cross-sectional view taken along line 5—5 in FIG. 2.

As shown in FIG. 2, a steering wheel 2 includes an annular steering grip 2, a pad 3 (shown by double-dotted lines) located at the central portion of the steering grip 2, and three spokes 4 for connecting the steering grip 2 to the pad 3. As shown in FIGS. 3, 4 and 5 the steering grip 2 is formed by a grip core 5, which is made of a light die-cast metal such as magnesium or magnesium alloy, and an encrustment 7a which encrusts the grip core 5. Each spoke 5 includes a spoke core 6A, 6B, or 6C, which are made from the same metal as the grip core 5, and an encrustment 7b, which encrusts part of the spoke cores 6A, 6B, 6C. The encrustments 7a, 7b are made of a soft resin material (e.g., polyurethane foam).

An accommodating space 9 is defined between the pad 3 and the spokes 4. A switch plate, a membrane switch, and an air bag device (none are shown) are arranged in the accommodating space 9. The membrane switch is fixed to the switch plate and has an upper thin plate and a lower thin plate, which constitute part of a horn switch (not shown). When the pad 3 is pressed, the thin plates contact each other and activates a horn. The air bag device includes a folded air bag, an inflator for inflating the air bag with gas, and a bag holder for holding the air bag and the inflator (none are shown).

As shown in FIGS. 2 to 4, the spoke cores 6A, 6B, 6C each extend radially inward from the steering grip 2. The left and right spoke cores 6A, 6B each have a horizontal portion, generally extending along a plane on which the steering grip 2 lies, and a diagonal portion, extending diagonally downward from the horizontal portion. Each spoke core 6A, 6B is connected to a coupling plate 11 located below the pad 3. The coupling plate 11 includes a boss 8. A bore 8a extends through the center of the boss 8 to receive a steering shaft 30. Accordingly, the steering wheel 1 is mounted on the steering shaft 30 by fitting the boss 8 on the steering shaft 30.

As shown in FIGS. 2 and 3, the perpendicular spoke core 6C (extending perpendicular to the spoke cores 6A, 6C as viewed in FIG. 2) is connected to the sides of the coupling plate 11 by a coupling bridge 12. As shown in FIG. 2, the coupling bridge 12 includes a pair of connecting portions 12a, a branch portion 12c connected to each coupling portion 12a, and a trunk portion 12b connected to the branch portions 12c. The trunk portion 12b extends perpendicular to a line connecting the spoke cores 6A, 6B and the center of the grip core 5. As shown in FIG. 3, the spoke core 6C is located at a position higher than the coupling plate 11. Each connecting portion 12a of the connecting bridge 12 extends diagonally upward from the coupling plate 11. The coupling bridge 12 deforms when force is applied to the steering grip 2 from above or from the driver's position. The height difference between the spoke core 6C and the coupling plate 11 is effective for deforming the coupling bridge 12. Deformation of the trunk portion 12b twists the branch portions 12c.

The structure for engaging the boss 8 and the steering shaft 30 will now be described. As shown in FIGS. 3 and 4, a threaded section 31 is defined on the distal end of the steering shaft 30. A serrated section 32 is defined below the threaded section 31. A tapered surface 33 is located under the serrated section 32. The serrated section 32 includes a predetermined number of axially extending grooves (generally thirty grooves). The bore 8a also has a serrated surface 8c corresponding to the serrated section 32 and the tapered surface 33, respectively. The boss 8 is fitted on the distal end of the steering shaft 30. A nut 34 is fastened to the threaded section 31, which projects from the boss 8, to secure the boss 8 to the steering shaft 30.

Figure 1:
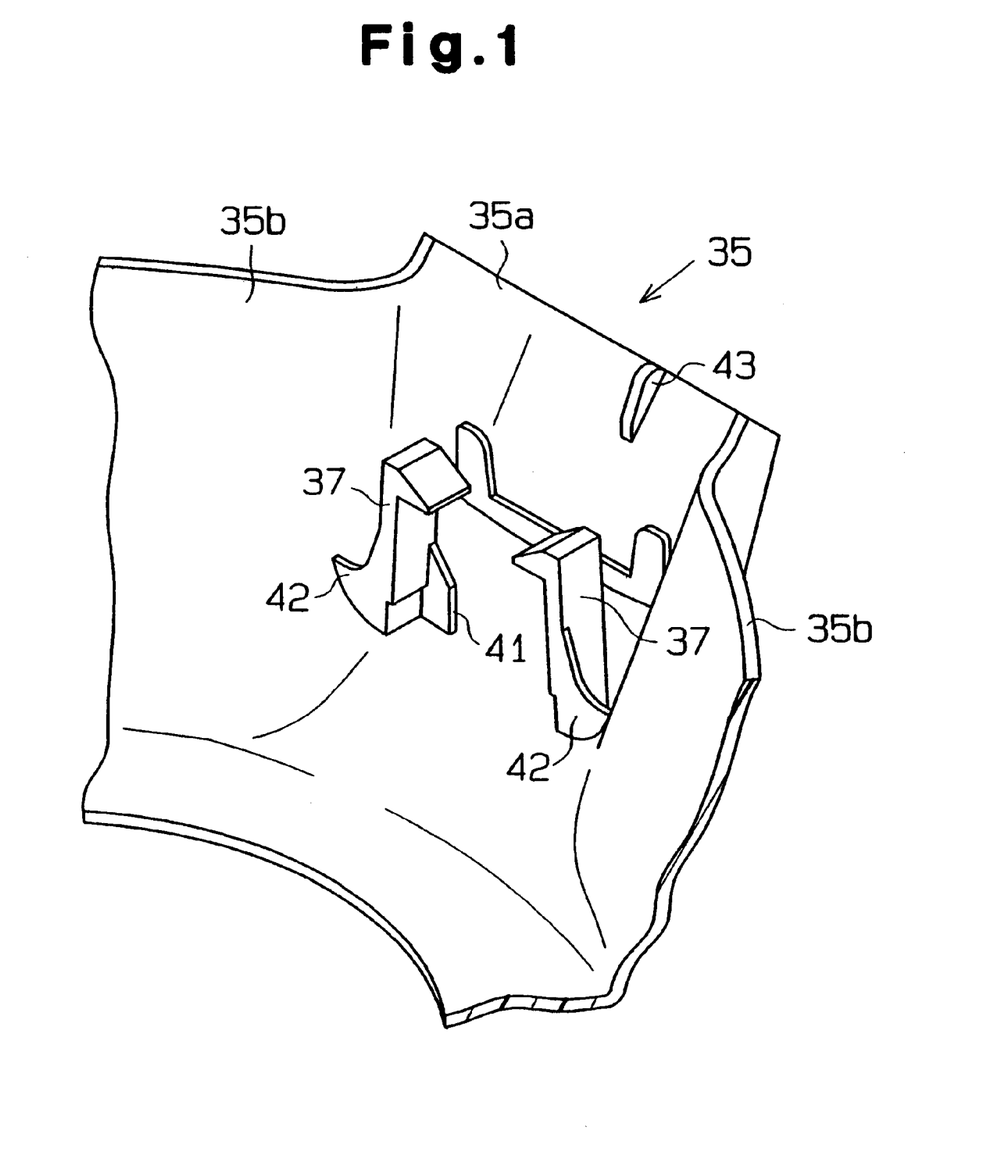
FIG. 1 is an enlarged perspective view partially showing a cover according to the present invention.
Figure 6:
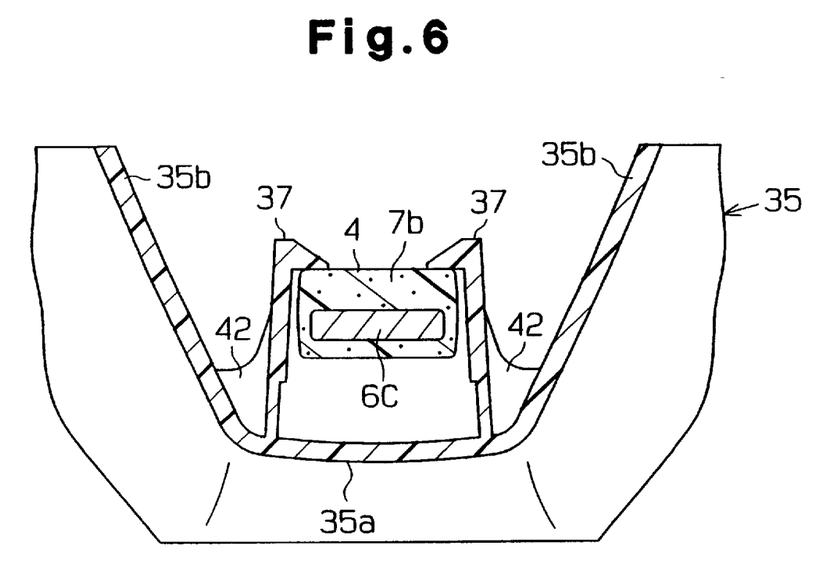
FIG. 6 is a cross-sectional view taken along line 6—6 in FIG. 2.
Figure 7:
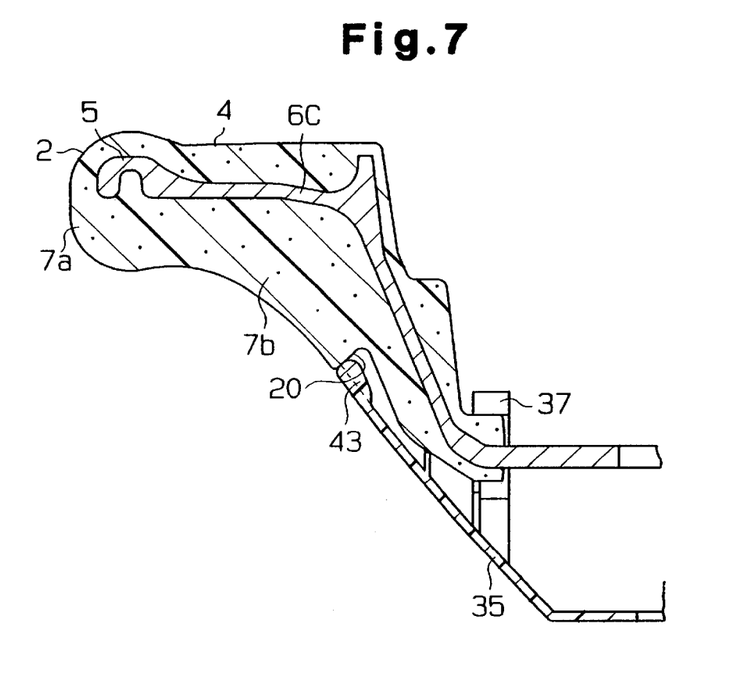
FIG. 7 is an enlarged cross-sectional view partially showing the steering wheel of FIG. 3.

As shown in FIGS. 1, 3, and 4, a resin back cover 35 is arranged below the spokes 4 and the pad 3. The back cover 35 covers most of the lower portion of the steering wheel 1. As shown in FIGS. 5 and 6, a bottom wall 35a and a pair of side walls 35b, which extend continuously from the bottom wall 35a, are provided on the back cover 35 in correspondence with each spoke 4. The side walls 35b cover each side of the associated spoke 4. The encrustment 7b of each spoke 4 has a depression 20 to receive the associated bottom and side walls 35a, 35b. The portions of the back cover 35 corresponding to the left and right spokes cores 6A, 6B (as viewed in FIG. 2) are fastened to the spoke cores 6A, 6B by screws (not shown). Two hooks 37 project from the bottom wall 35a, which corresponds to the perpendicular spoke core 6C. The hooks 37 hold the spoke 4 associated with the spoke core 6C (at a portion that cannot be viewed from outside). Accordingly, the back cover 35 is fastened to the steering wheel 1 by the screws and hooks The features of the present invention will now be described in detail. As shown in FIGS. 1 and 5, a holding rib 41 projects from the inner basal portion of each hook 37. The two hooks 37 are arranged such that the holding ribs 41 are faced toward each other. The spoke 4 associated with the spoke core 6C is held between the upper portions of the hooks 37 and its holding ribs 41. The distance between the opposing edges 41a of the ribs 41 becomes more narrow at positions closer to the base of the hooks 37. In addition, the distance S between the two holding ribs 41 at the closest point is more narrow than the width of the spoke 4.

As shown in FIGS. 1, 5, and 6, a connecting rib 42 projects from each hook 37 from the side opposite of the holding rib 41. The connecting rib 42 connects the hook 37 with the associated side wall 35b.

As shown in FIGS. 1, 3, and 4, a guide rib 43 projects from each bottom wall 35a of the back cover 35 near the cover rim in correspondence with the associated encrustment depression 20. Each guide rib 43 extends in the same direction as the associated spoke core 6A, 6B, 6C at the middle of the corresponding bottom wall 35a. The portion of each guide rib 43 that contacts the associated encrustment depression 20 is curved.

The advantages of the preferred and illustrated embodiment will now be described. Each guide rib 43 is formed integrally with the back cover 35 near the rim of the back cover 35 at a position corresponding to the encrustment of the associated spoke 4. Accordingly, when attaching the back cover 35 to the steering wheel 1, the guide rib 43 is moved along the encrustment 7b of the associated spoke 4. Thus, the back cover 35 is moved smoothly toward the designated position. This facilitates the attachment of the back cover 35.

Figure 8:
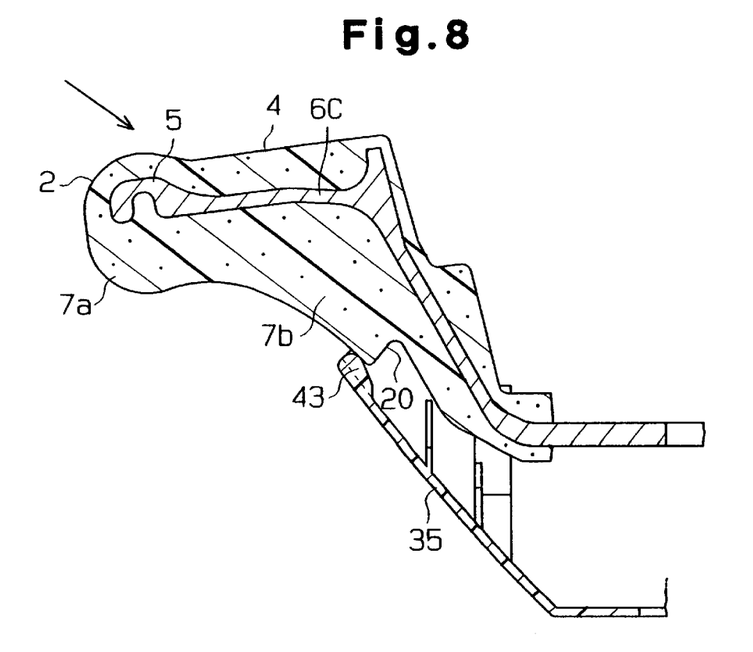
FIG. 8 is a cross-sectional view showing the state of the steering wheel of FIG. 7 during the application of force.

When force is applied to the steering wheel 1 from above or from the driver's position, the force is transmitted to the back cover 35 by way of the steering grip 2 and mainly the encrustment 7b of the spoke 4, which is closest to the driver. The guide rib 43, which corresponds to the spoke core 6C and contacts the associated encrustment depression 20, extends in the longitudinal direction of the spoke core 6C. Furthermore, the area of contact between the guide rib 43 and the depression 20 is small. Thus, the guide rib 43 relatively moves over the depression 20 and onto the outer surface of the spoke encrustment 7b in a relatively simple manner, as shown in FIG. 8. In other words, the guide rib 43 is separated from the depression 20 of the associated spoke 4 such that relative movement between the back cover 35 and the spokes 4 is permitted. This effectively absorbs the force applied to the steering wheel 1.

In addition, each guide rib 43 is curved at the portion that contacts the wall of the associated depression 20. This further enhances the relative movement of each guide rib 43 over the associated spoke 4 and permits smooth relative movement between the back cover 35 and the spokes 4. The curved portions of each guide rib 43 also serves to guide the movement of the back cover 35 when attaching the back cover 35.

The encrustment 7b is made of a soft synthetic resin (e.g., polyurethane foam). Accordingly, if force is applied to the steering wheel 1, the reaction force of each guide rib 43 easily deforms the associated depression 20. This further assists the relative movement between the guide rib 43 and the associated spoke 4.

Each guide rib 43 is arranged in the associated bottom wall 35a of the back cover 35 and separated from the side walls 35b. Accordingly, when force is applied to the steering wheel 1, the associated side walls 35b are easily separated from each other without interference from the guide rib 43. This facilitates and guarantees relative movement between the back cover 35 and the spokes 4.

Figure 9:
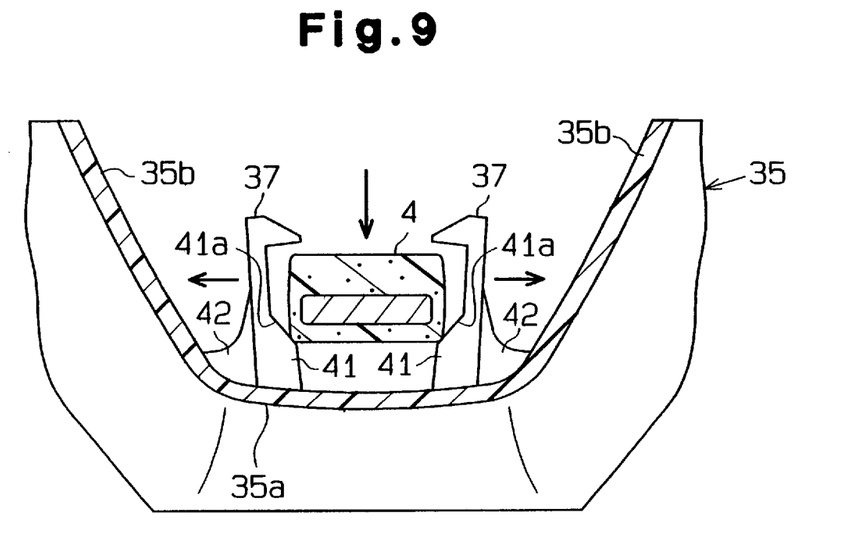
FIG. 9 is a cross-sectional view showing the state of the spoke of FIG. 5 during the application of force.
Figure 10:
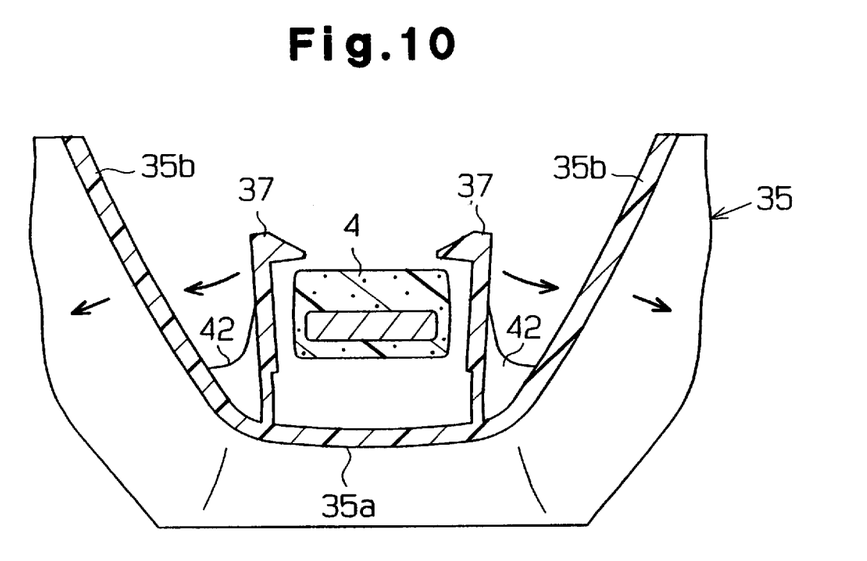
FIG. 10 is a cross-sectional view showing the state of the spoke of FIG. 6 during the application of force.

As shown in FIG. 9, the perpendicular spoke 4 presses the edges 41a of the associated holding ribs 41 when the spoke 4 moves with respect to the back cover 35. This widens the distance between the hooks 37 and permits separation of the spoke 4 from the hooks 37. Thus, relative movement between the spoke 4 and the back cover 35 is permitted. Accordingly, the holding ribs 41 in addition to the guide rib 43 facilitates relative movement between the back cover 35 and the perpendicular spoke 4.

Each connecting rib 42 connects the associated side wall 35b and hook 37. Thus, when the side walls 35b for each spoke 4 are separated from each other, the connecting ribs 42 are pulled and move away from each other. This easily separates the hooks 37 from the associated perpendicular spoke 4. In other words, the connecting ribs 42 function to separate the associated pair of hooks 37 from each other. Accordingly, the connecting ribs 42 facilitates relative movement between the spoke 4 and the back cover 35.

It should be apparent to those skilled in the art that the present invention may be embodied in many other specific forms without departing from the spirit or scope of the invention. More particularly, the present invention may be embodied as described below.

(1) In the preferred and illustrated embodiment, a single guide rib 43 is arranged at the middle of each bottom wall 35a. However, more than one guide rib 43 may be arranged on the bottom wall 35a.

(2) In the preferred and illustrated embodiment, a guide rib 43 is provided in correspondence with each spoke 4. However, the guide rib 43 need not be provided for the left and right spokes 4 that are located away from the driver. That is, the guide rib 43 need be provided for only the spoke 4 that is located closest to the driver.

(3) In the preferred and illustrated embodiment, the portion of each guide rib 43 that contacts the depression 20 of the encrustment 7b is curved. However, the contact portion may be formed having other shapes.

(4) In the preferred and illustrated embodiment, either one of the holding ribs 41 or the connecting ribs 42 may be eliminated from each hook 37.

(5) The hooks 37 may be eliminated and replaced by ribs having the combined functions of the holding and connecting ribs 41, 42. In this case, if the spokes 4 are moved downward relative to the back cover, the ribs separate the associated pair of side walls 35b from each other.

(6) In the preferred and illustrated embodiment, the hooks 37 are provided for the spoke 4 that is closest to the driver. However, hooks may be provided for the other spokes 4 (the left and right spokes corresponding to the spoke cores 6A, 6B). Furthermore, the portion of the spoke 4 held by the hooks 37 need not be the encrustment 7b. For example, a portion of a spoke core exposed from the encrustment 7b may be held by the hooks 37.

(7) In the preferred and illustrated embodiment, the encrustment 7b is made of a soft synthetic resin (e.g., polyurethane foam). However, a relatively hard material may be used instead.

(8) In the preferred and illustrated embodiment, the present invention is applied to a steering wheel 1 having three spokes. However, the present invention may be applied to a steering wheel having any number of spokes.

(9) In the preferred and illustrated embodiment, the membrane switch may be replaced by a leaf spring type horn switch or the like. Furthermore, the present invention may be applied to a steering wheel that does not have an air bag device.

(10) In the preferred and illustrated embodiment, the encrustments 7a, 7b may be formed integrally with the pad 3.

Therefore, the present examples and embodiments are to be considered as illustrative and not restrictive, and the invention is not to be limited to the details given herein, but may be modified within the scope and equivalence of the appended claims.

What is claimed is:

1. A steering wheel comprising:

an annular steering grip;

a spoke extending radially inward from the steering grip;

a back cover for covering a lower portion of the steering wheel, wherein the back cover has a rim located adjacent to the spoke; and a guide located at the vicinity of the back cover rim for guiding the back cover to a predetermined attaching position when attaching the back cover to the steering wheel, the guide extending in a longitudinal direction of the spoke and contacting the spoke, wherein the application of pressure on the guide by the spoke separates the guide from the spoke and permits relative movement between the back cover and the spoke.

2. The steering wheel according to claim 1, wherein the guide has a portion facing the spoke, said portion being curved.

3. The steering wheel according to claim 1, wherein the spoke is covered by a relatively soft encrustment, and wherein the guide contacts the encrustment.

4. The steering wheel according to claim 1, wherein the back cover includes a bottom wall for covering the spoke from beneath and a pair of side walls extending continuously from the bottom wall to cover the sides of the spoke, and wherein the guide is located on the bottom wall.

5. The steering wheel according to claim 1, wherein the spoke includes a depression that contacts the guide and that separates from the guide when the depression is pressed against the guide.

6. A steering wheel comprising:

an annular steering grip;

a spoke extending radially inward from the steering grip;

a back cover for covering a lower portion of the steering wheel;

a pair of hooks projecting from the back cover and facing each other, wherein the spoke is held between the hooks to attach the back cover to the steering wheel; and a releasing member provided for each hook, wherein the releasing members separate the hooks from each other to release the spoke and permit relative movement between the back cover and the spoke when sufficient force is applied to the spoke.

7. The steering wheel according to claim 6, wherein each releasing member comprises a holding rib having an inclined edge that contacts the spoke, wherein the ribs face each other and the distance between the inclined edges narrows at positions closer to a base of the hooks.

8. The steering wheel according to claim 6, wherein the back cover further comprises a bottom wall for covering the spoke from beneath and a pair of side walls extending continuously from the bottom wall to cover the sides of the spoke, and wherein the hooks are located on the bottom wall.

9. The steering wheel according to claim 8 further comprising a connecting rib provided for each hook to connect the hook to the associated side wall, and wherein the connecting ribs separate the hooks from each other to release the spoke when a force that separates the side walls acts on the back cover.

10. A steering wheel comprising:

an annular steering grip;

a spoke extending radially inward from the steering grip;

a back cover for covering the lower portion of the steering wheel, wherein the back cover comprises a bottom wall for covering the spoke from beneath and a pair of side walls extending continuously from the bottom wall to cover the sides of the spoke;

a pair of hooks projecting from the bottom wall and facing each other, wherein the spoke is held between the hooks to attach the back cover to the steering wheel; and a connecting rib provided for each hook to connect the hook to the associated side wall, wherein the connecting ribs separate the hooks from each other to release the spoke when a force that separates the side walls acts on the back cover.

11. A steering wheel comprising:

an annular steering grip;

a spoke extending radially inward from the steering grip;

a back cover for covering the lower portion of the steering wheel, wherein the back cover comprises a bottom wall for covering the spoke from beneath and a pair of side walls extending continuously from the bottom wall to cover the sides of the spoke, the bottom wall and the side walls each having an edge located adjacent to the spoke, and wherein the spoke has a depression for contact with the edges of the bottom wall and the side walls; and a guide rib located at the vicinity of the bottom wall for guiding the back cover to a predetermined attaching position when attaching the back cover to the steering wheel, the guide rib extending in a longitudinal direction of the spoke and contacting the spoke, wherein the application of pressure on the guide rib by the spoke depression separates the guide rib from the depression and permits relative movement between the back cover and the spoke.

12. The steering wheel according to claim 11, wherein the guide rib has a portion facing the spoke, said portion being curved.

13. The steering wheel according to claim 12, wherein the spoke is covered by a relatively soft encrustment made of synthetic resin, and wherein the guide rib contacts the encrustment.

14. The steering wheel according to claim 11 further comprising:

a pair of hooks projecting from the bottom wall and facing each other, wherein the spoke is held between the hooks to attach the back cover to the steering wheel; and a releasing member provided for each hook, wherein the releasing members separate the hooks from each other to release the hooks from the spoke and permit relative movement between the back cover and the spoke when the spoke is pressed against the releasing member.

15. The steering wheel according to claim 14, wherein the releasing member comprises a holding rib provided on each hook and having an inclined edge that contacts the spoke, wherein the holding ribs are faced toward each other and the distance between the inclined edges becomes more narrow at positions closer to the hooks.

16. The steering wheel according to claim 15 further comprising a connecting rib provided for each hook to connect the hook to the associated side wall, and wherein the connecting ribs separate the hooks from each other to release the spoke when a force that separates the side walls acts on the back cover.

* * * * *